Sept. 8, 1936.  K. M. KEITH ET AL  2,053,794
GRAIN DRILL
Filed July 8, 1935  5 Sheets-Sheet 1
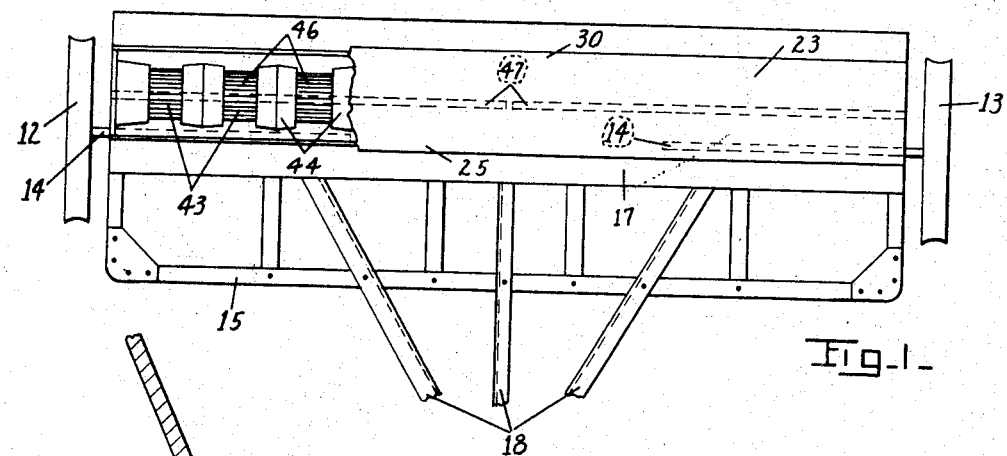
Fig. 1.
Fig. 2.
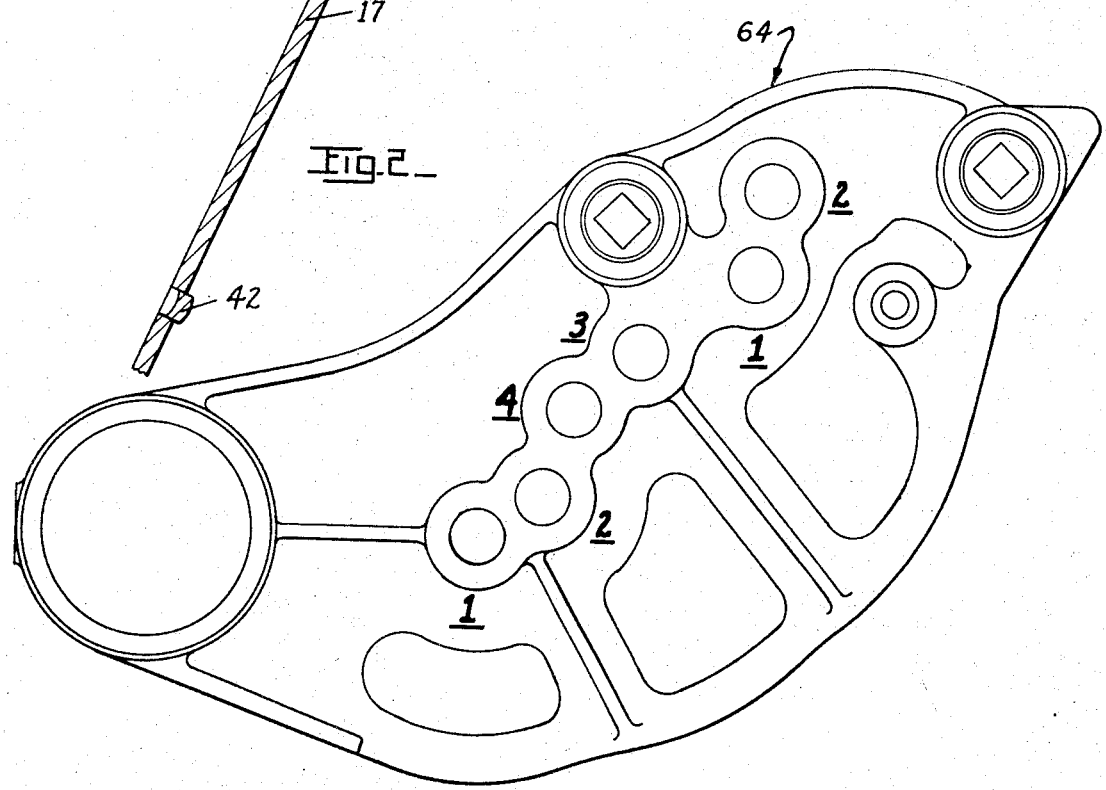
Fig. 3.
INVENTORS
KENNETH M. KEITH.
BY ORVILLE J. PARKS.
ATTORNEY

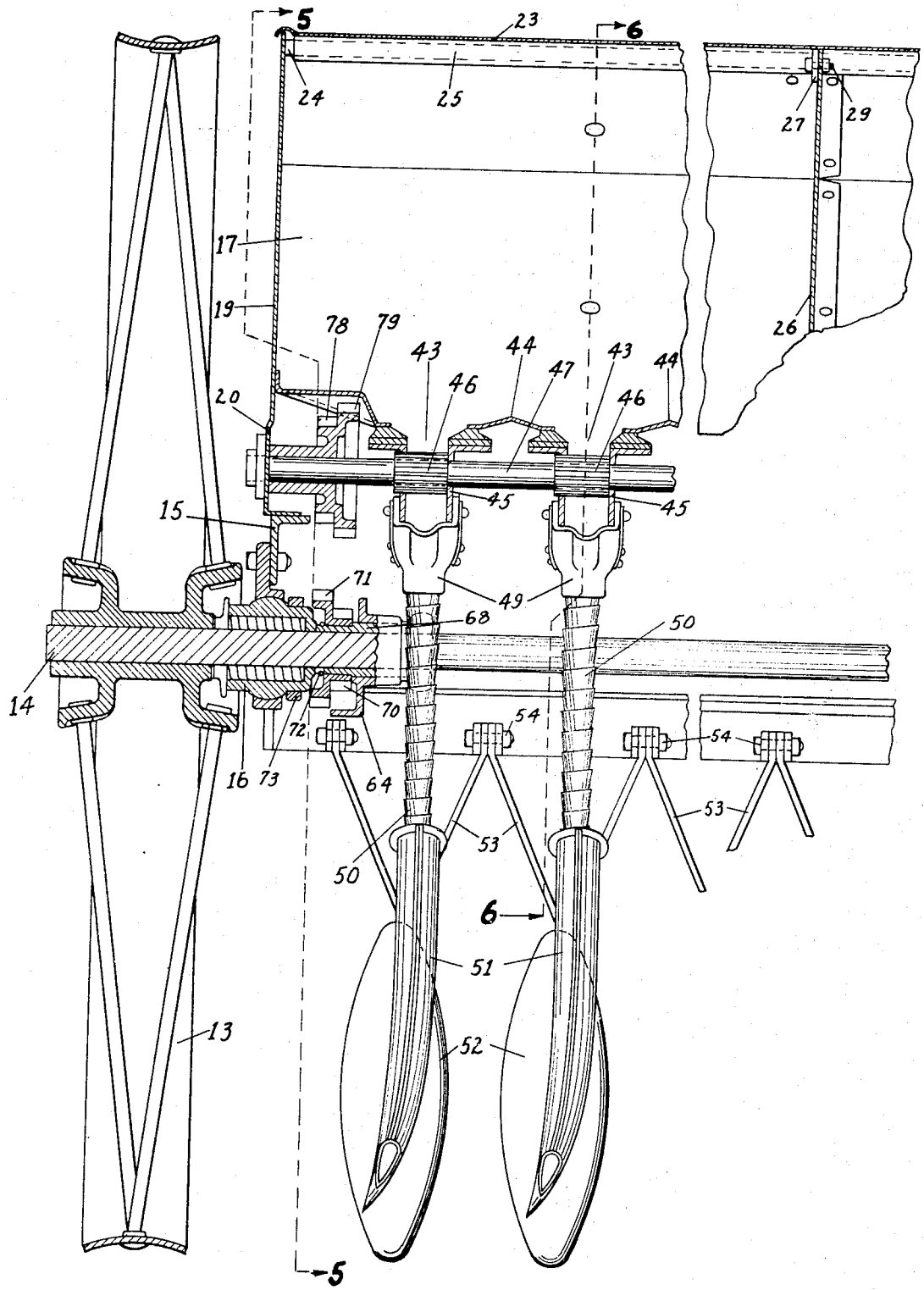

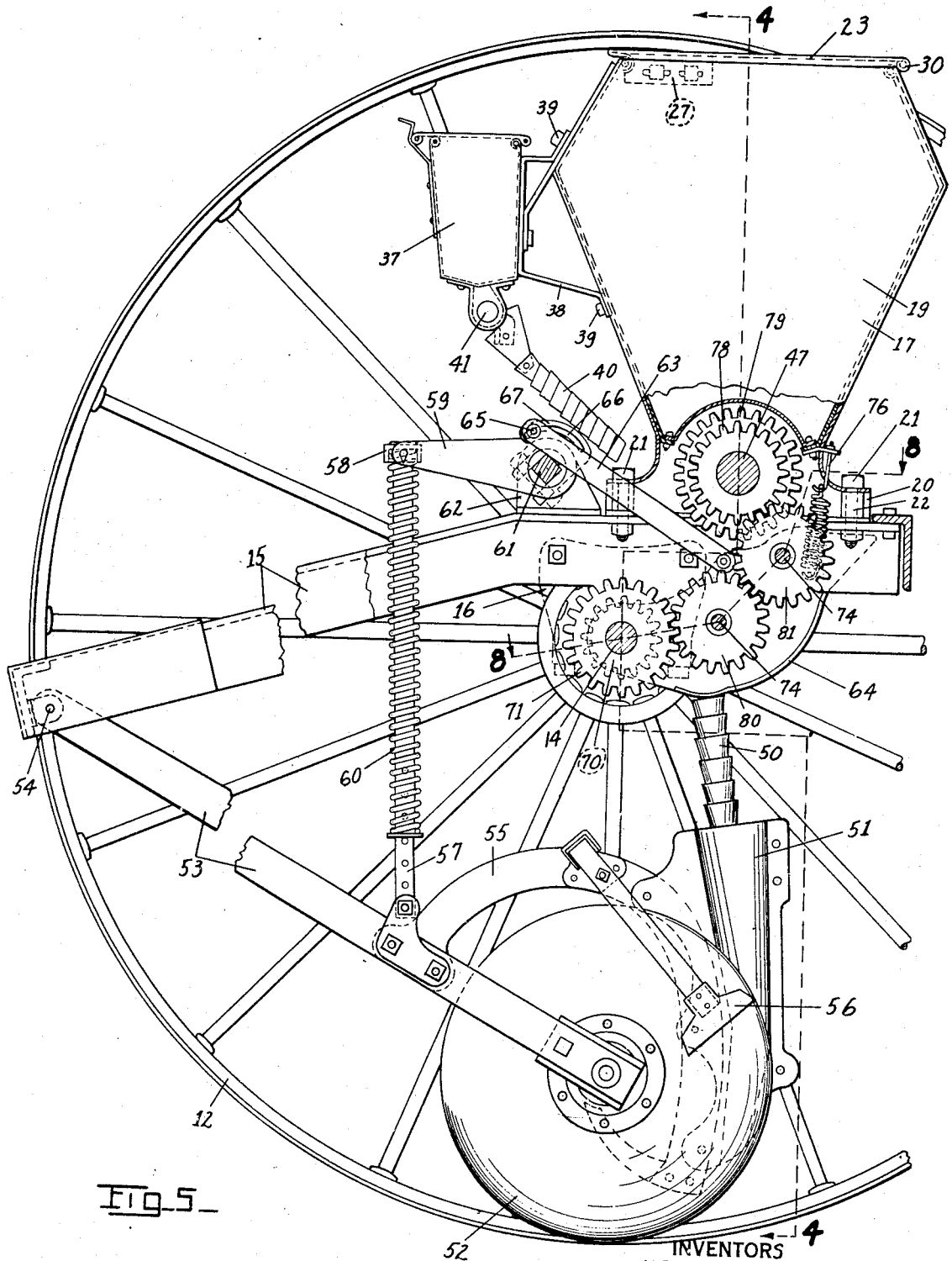

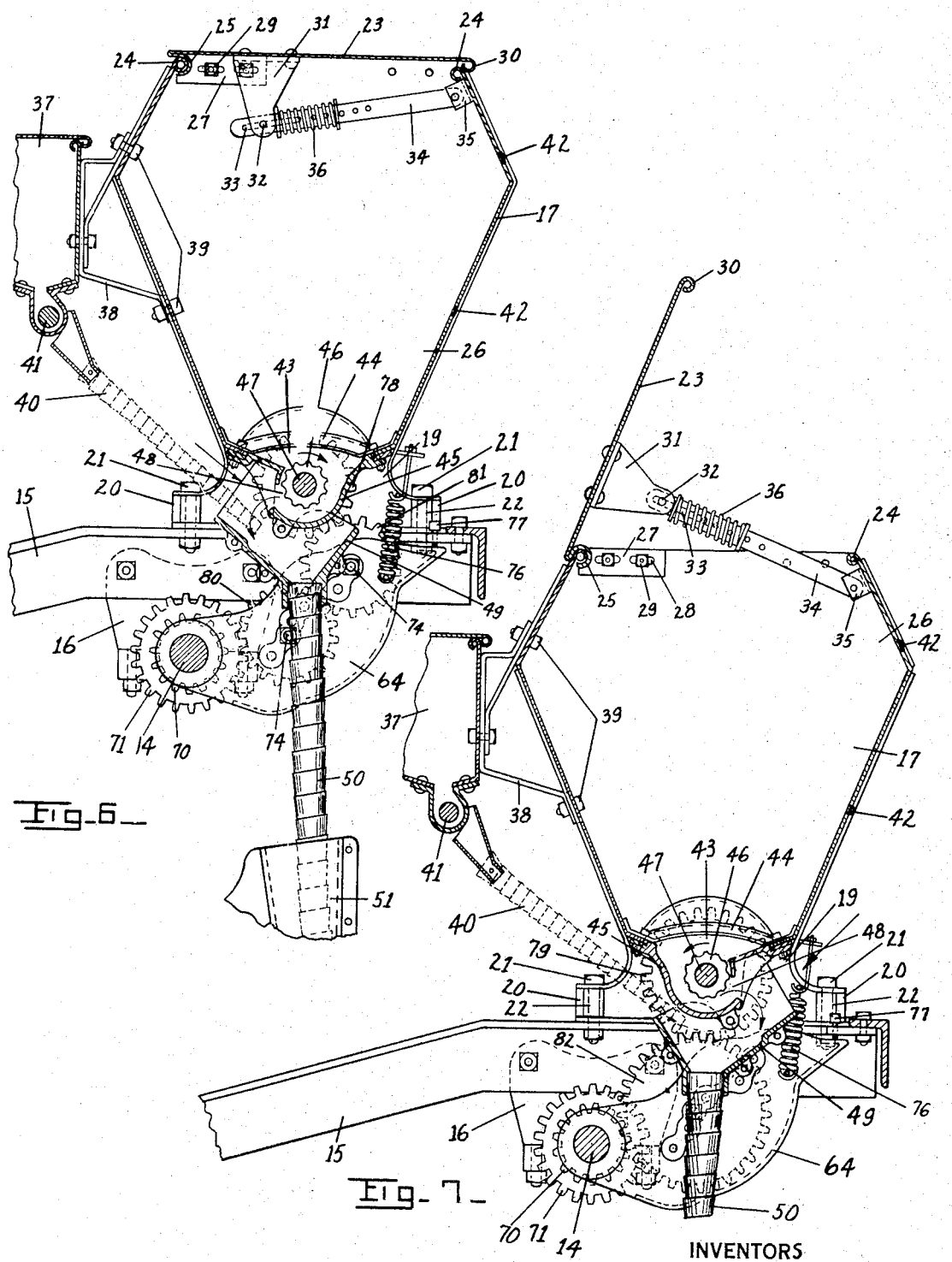

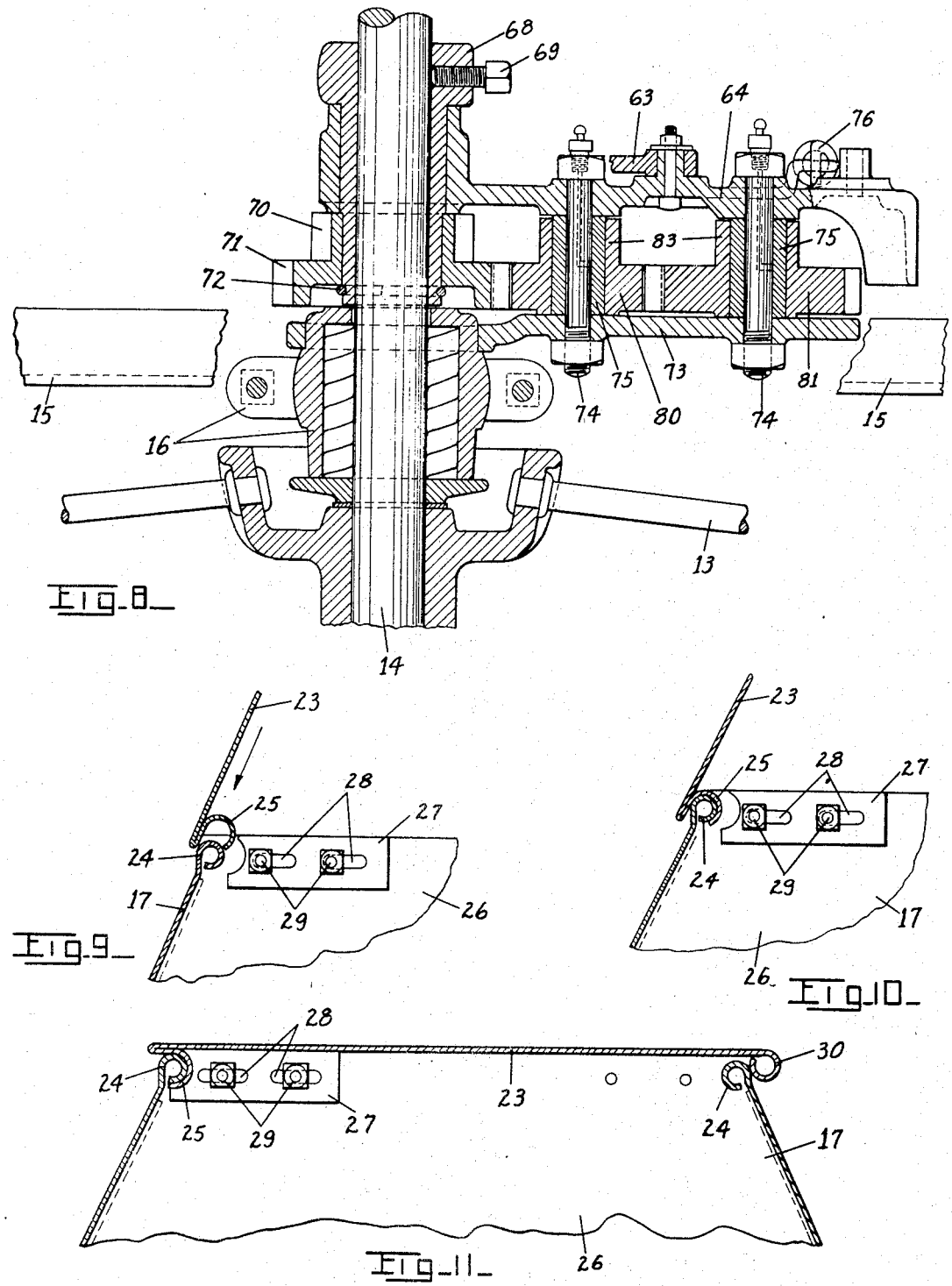

Patented Sept. 8, 1936

2,053,794

UNITED STATES PATENT OFFICE 2,053,794

GRAIN DRILL

Kenneth M. Keith, Minneapolis, and Orville J. Parks, Hopkins, Minn., assignors to Minneapolis-Moline Power Implement Company, Minneapolis, Minn., a corporation of Delaware Application July 8, 1935, Serial No. 30,240

12 Claims. (Cl. 111—52)

This invention relates to grain drills, and the primary object is to provide a machine for drilling or planting seed and grain that is not only highly efficient and practical in operation and use, but has several novel structural features including a designed arrangement permitting reversibility and adjustability of various parts, depending upon whether the machine is to be tractor or horse drawn, in which instances the operator is stationed at relatively forward and rearward positions, and must therefore be able to make observations and adjustments from the positions thus determined. A further object is to provide a simple, efficient, and easily adjusted seed feed transmission for transmitting power from the main axles of the machine to the feed shafts, such transmission being correlated and associated with the aforementioned reversibility features in such a manner that by a simple substitution and end to end reversement of certain gears the transmission assembly will provide power at different speeds and in reversible directions as various circumstances may require. These and still other more detailed and specific objects will be disclosed in the course of the following specification, reference being had to the accompanying drawings wherein is illustrated a preferred embodiment of the invention, and wherein:

Fig. 1 is a top or plan view of a grain drill of a conventional type now in common use and to which our invention is adapted.

Fig. 2 is an enlarged detail sectional view through a portion of the seed hopper, as seen at the right in Figs. 6 and 7.

Fig. 3 is an enlarged detail elevation of the gear bracket 64 as seen when detached from the machine and with all gears removed therefrom.

Fig. 4 is a sectional elevation through the left end of the machine, on the irregular line 4—4 in Fig. 5, and with some parts omitted.

Fig. 5 is a sectional elevation on the line 5—5 in Fig. 4.

Fig. 6 is a sectional elevation on the line 6—6 in Fig. 4, the gear mechanism on the right end of the machine, which corresponds to the left end mechanism disclosed in Fig. 5, being shown.

Fig. 7 is a sectional elevation similar to Fig. 6 but shows the hopper reversed and the reverse gear train feed applied.

Fig. 8 is an enlarged detail section substantially on the irregular line 8—8 in Fig. 5.

Figs. 9, 10, and 11 are enlarged sectional detail views illustrating the reversible seed hopper cover attaching means.

Referring to the drawings more particularly and by reference characters, 12 and 13 respectively designate the right and left ground wheels of the drill, these wheels being mounted on to rotate axles 14 which extend in from opposite ends of the main frame 15 and are journaled in bearings 16 thereof. These axles furnish power to the seed feed transmission mechanisms, one at each end of the frame 15. A hopper 17 extends transversely between the wheels 12—13 and is releasably secured for reversible end to end attachment on the main frame. The drill is propelled by a draft frame 18 which is attached behind a tractor or horses by a suitable hitch connection, here omitted.

The hopper 17 has end walls 19 which extend down below the bottom proper and are formed with laterally projecting (front and rear), integral, channel shaped arms 20 which are rigidly secured to the side beams of the frame 15 by bolts 21, spacers 22 being preferably employed to lend rigidity to the structure. The bolt holes in the hopper and frame are so arranged that the hopper may be removed, reversed end for end, and resecured by the same bolts; and in such a manner that feed transmission connections will be established when in either position.

When the hopper 17 is reversed on the main frame its cover 23 will of course be reversed with it, but as it is desirable to always hinge the cover so that it will open to the rear (i. e., swing upwardly and forwardly), provision is made for reversibly securing the cover with respect to the hopper, and this is accomplished as follows, and with particular reference to Figs. 9, 10, and 11:

The upper edge portions of the front and rear walls of the hopper 17 are formed with integral flange beads 24 which, in addition to reinforcing such walls, are circular in cross section to serve as bearing pintles or tubes for an open sleeve 25 formed by a reversely curved, longitudinal edge portion of the cover. This hinge sleeve 25 has a longitudinal opening of slightly lesser size than the outside diameter of the beads 24, but the resiliency of the material permits the sleeve to be pressed down with a snap action over the bead, and when so secured obviously provides a very efficient and practical hinge connection for the cover. To further insure retention of the connection, however, cross partitions 26 in the hopper may be provided with small retention blocks 27, having slots 28 through which pass the securing bolts 29. These blocks have adjustable end engagement with the sleeve 25, as shown in Fig. 11, but may be withdrawn therefrom, without removal, to permit application or removal of the cover, as indicated in Figs. 9 and 10. The swinging or rear edge of the cover has a reenforcing bead 30 which preferably closes over the adjacent hopper bead 24.

The cover 23 is releasably secured in opened and closed position by spring devices, one of which is shown in Figs. 6 and 7, and which includes a bracket arm 31 secured to the inner face of the cover and having a pin 32 for sliding engagement in a slot 33 of a link bar 34 pivoted to a lug 35 on the rear wall of the hopper. A spring 36 encircling the bar and adjustable with respect thereto presses against the bracket arm 31, and as the cover movements raise or lower the pin 32 with respect to the dead center between 24 and 35 the spring will act to releasably hold the cover open or closed.

When the cover is to be reversed on the hopper the blocks 27 and lugs 35 are removed and reapplied at the opposite sides, and to this end the partitions 26 may be provided with full holes to accommodate the reapplied block bolts 29, but the new or second position holes, for the bolts of lugs 35, are preferably only half punched out, as illustrated (for other devices) in Fig. 2, and such holes are then completely opened when the change is actually to be made.

A second or auxiliary hopper 37, used when planting grass and certain other seed, is attached to the front wall of the main hopper 17 by brackets 38 and bolts 39. The seed from hopper 17 is fed through spouts 40 to the lower tube holders, under the action of a feed shaft 41 driven by means (not shown) from the main transmission mechanisms.

When the position of the main hopper 17 is reversed on the supporting frame, relative forward position of the hopper 37 is maintained, and to this end the frames or brackets 38 must be removed and resecured to the opposite wall of the larger hopper. Such opposite wall is therefore provided with partially punched holes, as shown at 42 in Fig. 2, and these holes are then completely opened when the transposition is made. Until such time the plugs 42 prevent leakage of grain from the hopper. Any once opened holes, in either wall of the hopper, and not currently in use, must of course be plugged with bolts or other stoppers to prevent grain leakage.

The hopper 17 is provided with seed discharge openings 43, separated by ridged divider plates 44. A series of seed feed cups 45 are secured under the openings 43 and in each of these cups operates a feed roll 46, the feed rolls under each half of the hopper being secured on a feed shaft 47. As the feed rolls are rotated, in the directions indicated by the arrows in Figs. 6 and 7, they operate to move the seed out through feed cup openings 48, whereupon the seed falls into holders 49 of the feed tubes 50, the holders 49 being hung from the hopper under the feed cups. It will be noted that the holders 49 are flared and sufficiently spaced below the cups 45 so as to expose the feed openings 48 to the view of the operator.

It will also be noted that in the arrangement shown in Fig. 6 the opening 48 is directed forwardly, while in the reversed or transposed arrangement disclosed in Fig. 7 the feed opening 48 is directly rearwardly.

The significance of the reversibility features thus described is of substantial importance because it enables the conversion or transposition to be effected with a minimum amount of time and effort and without the need of any skilled help in doing so. Any farmer owning the machine and desiring to convert it from tractor to horse drawn use, or vice versa, can do so without the aid of factory help or additional appliances.

If the machine is set up for tractor drawn propulsion, where the operator assumes a position on the tractor and in advance of the drill, the parts will be arranged as shown in Fig. 6, and as the feed cup openings 48 are directed forwardly or within view of the operator, a most essential prerequisite, he is able to observe the feeding operation and may stop the machine to make adjustments or clearances whenever any feeding roll should function abnormally or become clogged. It is also necessary that the hopper cover swing forward as grain is filled into the hopper from the rear of the machine, and for that reason is hinged at its forward edge as shown.

When the machine is to be converted to horse drawn use, at which time the operator is stationed back of the hopper and must be able to make seed feeding observations from the rear, the hopper anchoring bolts 21 are first removed, after which the hopper, including the full series of feed devices 45, 46, 47, 49, and 50, is removed, reversed end for end, and resecured by bolts 21 and spacers 22. The flexible tubes 50 are of course merely lifted out of the feed spouts or boots 51 of the furrow opening units and reinserted in the corresponding boots at the other side of the drill.

With the hopper reversed the cover 23 is then reversed on the hopper, so that the hopper can again be filled from the rear, and the grass seed hopper 37 is also repositioned, as above set forth. With the operator now walking behind the drill, standing on a rear platform, or riding a sulky attached to the drill, he has all of the feed openings 48 directed rearwardly so that full observations and adjustments can be made.

Each of the boots 51, which conveys the seed into the ground, is associated with a furrow opener which may be of various designs but is here illustrated as a disc 52. The discs are mounted on inclined draw bars 53 which are pivoted to the main frame, as at 54, and have rigid arm extensions 55 for supporting the boots 51 and may also carry disc scrapers 56.

The draw bars 53 are attached to suspension bars 57 for adjusting the operating depth limits of the furrow openers, and for entirely lifting them from the ground when the machine is to be run idle. These bars 57 have limited sliding movement in collars 58 pivoted to the forward ends of arms 59, and adjustable compression springs 60, encircling the bars, tend to hold them yieldably downward.

The arms 59 are fixed on a square shaft 61 journaled for rotation in bearings 62 on the frame 15. The shaft 61 is rotatably adjusted by any suitable manually operative means (not shown) to vertically adjust the furrow openers.

A mechanism is also provided for automatically disconnecting the power transmission to the seed feed when the furrow openers are raised to inactive position, and for re-establishing the transmission connection when the openers are again lowered. This includes a link rod 63, pivotally connected at its rear end to a gear bracket 64 while its forward end has a pivot pin 65 slidable in an arcuate slot 66 of a segment 67 on the shaft 61. The pin and slot arrangement is such as to permit normal fluctuations of the furrow openers, due to ground irregularities and obstructions, without stopping the seed feed, but will produce a rearward movement of the link, when a predetermined manual lift is made, to force down one end of the bracket 64 to disengage certain gears in the feed transmission.

The front end of the gear bracket 64 trunnions on a sleeve 68 secured on the axle 14 by a set screw 69, and upon a squared portion of the sleeve is non-rotatably mounted a double spur gear 70—71, being releasably secured by spring clip ring 72. The bracket 64 has a complemental bracket plate 73 which trunnions on the bearing hub 16 and is connected to bracket 64 by shaft forming bolts 74 for selectively reversible and interchangeable intermediate gears. Bushings 75, for such gears, are mounted on the bolts 74 and also serve as spacers between bracket members 64 and 73, and as such spacers are slightly longer than the carried gear hubs the shaft bolts 74 can be securely tightened to rigidly connect the bracket members so that they will move as one unit and without in any way binding on the intermediate gears.

The rear end of the gear and bracket assembly 64, 73—75 is normally maintained in a raised position by a spring 76 which connects it to the hopper 17, and at such time the power transmission gear train from axle 14 to feed shaft 47 is closed or active. The spring 76 pulls the unit up into contact with an adjustable stop, here represented by a set screw 77 (Figs. 6 and 7). When the furrow openers are raised into inoperative position the square shaft 61 is turned to push the link 63 forward, and such action in turn presses the rear end of the bracket unit 64—73 down, against the tension of spring 76, to disengage the bracket gears from the feed shaft gear to thus break the train of transmission and idle the feed shaft until the furrow openers are again lowered, when the spring 76 will re-establish the train of power transmission.

The gear transmission is designed to selectively provide high and low speeds to the feed shaft, and in either direction, depending upon whether the feed cup openings face the front or rear, and the brackets 64 and 73 are provided with a series of holes in which the intermediate gear shaft bolts are selectively engageable to accommodate the several arrangements. Double spur gears 78, 79 are fixed on each of the feed shafts 47, and are identical as to size and arrangement on the respective shafts so that reversing the hopper assembly will in no way alter their relative positions.

When the drill is to be tractor drawn, with the feed cups 45 opening forwardly, two intermediate gears 80 and 81 are used, as in Figs. 5, 6, and 8, and such gears, as shown, are of the same size. When the drill is to be horse drawn, at which time the operator is back of the drill and the feed cup openings 48 are directed rearwardly, it is necessary to rotate the feed shaft in the opposite direction, and therefore only one intermediate gear, 82, is provided, as indicated in Fig. 7.

For relatively high speed, and with the feed cups opening forwardly, the gears 80 and 81 are arranged as shown in Figs. 5, 6, and 8, and with their projecting hubs 83 toward the bracket 64. The gear bolts 74 are placed in the bracket holes "2", "2", marked on the casting as in Fig. 3. This arrangement will establish high speed connection from the axle 14 to feed shaft 47 through gears 71, 80, 81, and 78. To transform the gear train for low speed transmission, the gears 80 and 81 are reversed on their bolts 74, so that the gear hubs 83 will be directed toward bracket plate 73, and the bolts 74 are now inserted in the holes marked "1", "1", in Fig. 3. This will establish the transmission train from axle 14 to feed shaft 47 through gears 70, 80, 81, and 79.

When the hopper is reversed for horse drawn use the two intermediate gears 80, 81 are removed and substituted by the large, single gear 82. For low speed transmission the shaft bolt for gear 82 is placed in hole "4", at which time the gear will interconnect axle gear 70 with feed shaft gear 79, as in Fig. 7. For high speed transmission the gear 82 is reversed on its shaft bolt and the latter is inserted in bracket hole 3, whereupon gear 82 will interconnect axle gear 71 with feed shaft gear 78.

From the foregoing specification, considered in connection with the drawings, the structure, function, operation, and advantages of the machine and its various features will no doubt be readily understood. It is further understood, however, that the disclosure thus made is only representative of a preferred embodiment of the invention, and various changes and modifications may be made without departing from the spirit and scope of the appended claims.

Having now therefore fully shown and described our invention, what we claim to be new and desire to protect by Letters Patent is:

1. A grain drill comprising a wheel supported frame, a hopper assembly on the frame and comprising a hopper, feed shafts one for each end of the hopper, and feed cups under the hopper having feed sight openings facing in a common direction, said hopper assembly being front to back reversible on the frame whereby said feed sight openings may be faced either forwardly or rearwardly, means for securing the hopper assembly on the frame in either of its reversible positions, and means for transmitting power from the wheels to said feed shafts selectively in either direction of rotation.

2. A grain drill comprising a wheel supported frame, an assembly including a hopper and feed mechanism with a feed shaft and with feed sight openings facing in a common direction, means for securing the assembly on the frame selectively in reversed positions whereby the feed sight openings may face either forwardly or rearwardly, and power transmission mechanism between the ground wheels and said feed shaft including interchangeable gearing for driving the feed shaft selectively in opposite directions depending upon the direction of the feed sight openings.

3. In a grain drill, a frame, a drive axle journaled therein, a reversible hopper and means for selectively securing the hopper to the frame in end to end reversible positions, a feed mechanism carried by the hopper and including a feed shaft extending longitudinally thereof, a gear on one end of the feed shaft and movable out of and into operative position together with the hopper when the latter is reversed, and power transmission means, connected with the drive axle, including a driven gear normally in position to mesh with the feed shaft gear when the latter is moved into said operative position.

4. In a grain drill, a frame, a drive axle journaled therein, an elongated hopper arranged transversely of the frame, means for selectively securing the hopper to the frame in end to end reversible positions, a feed mechanism carried by the hopper and including a feed shaft extending longitudinally thereof, a gear on one end of the feed shaft and movable out of and into operative positions together with the hopper when the latter is reversed on the frame, and power transmission means, connected with the drive axle, including a driven gear normally in position to mesh with the feed shaft gear when the latter is moved into either of said operative positions, and means for shifting the said driven gear into inactive position with respect to meshing relationship with the feed shaft gear.

5. In a grain drill, the combination comprising a driving shaft, a grain feeding mechanism, a driven shaft operating the feeding mechanism, high and low speed spur gears on each of said shafts, intermediate gear means for establishing driving connection between gears of the two shafts selectively in either direction of rotation, a support for the intermediate gear means, and means, radially adjustable with respect to both of said shafts, for securing the intermediate gear means to the support, said intermediate gear means being adjustable, transversely with respect to the plane of the shaft gears, and in conjunction with said radial adjustment, to selectively interconnect the respective high and low speed gears of the driving and driven shafts.

6. In a grain drill, the combination comprising a driving shaft, a grain feeding mechanism, a driven shaft operating the feeding mechanism, high and low speed spur gears on each of said shafts, intermediate selectively interchangeable gear means for establishing driving connection between gears of the two shafts, a support for the intermediate gear means, and means, radially adjustable with respect to both of said shafts, for selectively securing the intermediate gear means in reversed and transversely shifted positions to the support, to thereby selectively interconnect the high and low speed gears of the driving and driven shafts to drive the driven shaft in either direction of rotation.

7. In a grain drill, the combination comprising a driving shaft, a grain feeding mechanism, a driven shaft operating the feeding mechanism, high and low speed spur gears on each of said shafts, intermediate gear means for establishing driving connection between gears of the two shafts selectively in either direction of rotation, a support for the intermediate gear means, and means, radially adjustable with respect to both of said shafts, for selectively securing the intermediate gear means in reversed and transversely shifted positions to the support, to thereby selectively interconnect the high and low speed gears of the driving and driven shafts, said intermediate gear means having offset hub means at one side only for locating the intermediate gear means in aligned positions with the high or low speed gears when the intermediate gear means is selectively reversed.

8. In a grain drill, the combination comprising a feed device, a driving shaft, a driven shaft operating the feed device, high and low speed spur gears on the driving and driven shafts, stub shaft means, intermediate gear means having hub means projecting from one side and axially reversible on the stub shaft means to offset the gear means to one side or the other, selectively, so as to respectively interconnect the said high and low speed spur gears of the driving and driven shafts, a bracket swingable on the axis of the driving shaft to adjustably support said stub shaft means, and means for swinging the bracket to move the intermediate gear means into and out of meshing position with respect to the spur gears on the driven shaft, said intermediate gear means being selectively adjustable and operative to drive the driven shaft in either direction of rotation.

9. In a grain drill, the combination with a driving shaft and a feed device operated by a grain feed shaft, of a pair of spur gears of different diameters on the driving shaft, a pair of spur gears of different diameters on the grain feed shaft, an intermediate gear support bracket swingable on the axis of the driving shaft, interchangeable intermediate gears, means for selectively and reversibly securing the intermediate gears to said bracket for establishing high and low driving connections from the spur gears of the driving shaft to the spur gears of the driven shaft and in either direction of rotation, and means for moving the swingable bracket to separate the intermediate gear meshing with the feed shaft gear therefrom.

10. In a grain drill, the combination with a driving shaft, a feed mechanism, and a grain feed shaft, of a pair of spur gears of different diameters on the driving shaft, a pair of spur gears of different diameters on the grain feed shaft, an intermediate gear support bracket, interchangeable intermediate gears, means for selectively and reversibly securing the intermediate gears to said bracket for establishing high and low driving connections from the spur gears of the driving shaft to the spur gears of the driven shaft and in either direction of rotation, and means for adjusting the bracket to render operative and inoperative the intermediate gear connection with the feed shaft gears.

11. In a grain drill, the combination with a drive shaft, a feed mechanism, and a driven grain feed shaft operating the feed mechanism, of power transmission mechanism connecting said shafts comprising a bracket swingable from one end about one of the shafts and adjustably held in operative position with respect to the other shaft, high and low speed spur gears secured upon each of said shafts, intermediate gear means carried by the bracket and for selectively rotating the feed shaft in either direction of rotation, and means associated with the bracket providing for the removal and/or reversal of said intermediate gear means to establish the high or low speed connections between said drive and driven shaft gears.

12. In a grain drill, the combination with a drive shaft and a feed mechanism operated by a driven grain feed shaft, of power transmission mechanism connecting said shafts comprising a bracket swingable from one end about one of the shafts and adjustably held in operative position with respect to the other shaft, high and low speed spur gears secured upon each of said shafts, intermediate gear means carried by the bracket, and means associated with the bracket providing for the removal, interchangeability, and/or reversal of said intermediate gear means to selectively establish high and low speed connections to the driven shaft and in either direction of rotation.

KENNETH M. KEITH.
ORVILLE J. PARKS.